Sept. 5, 1939.　　　K. EHRGOTT　　　2,172,194
TOASTER
Filed Oct. 16, 1936
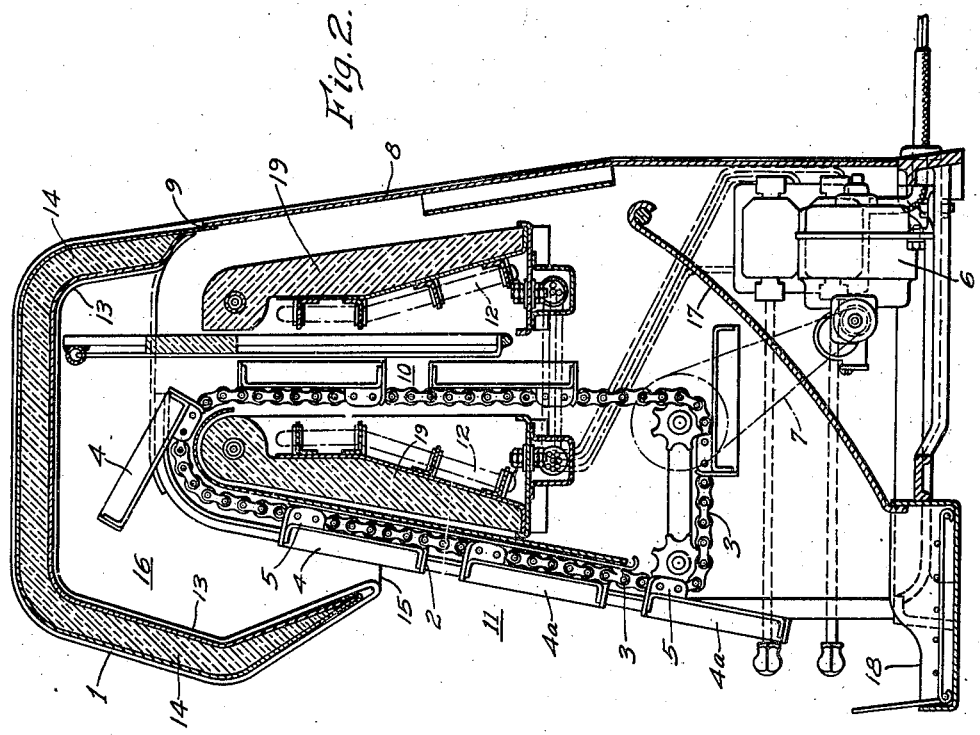
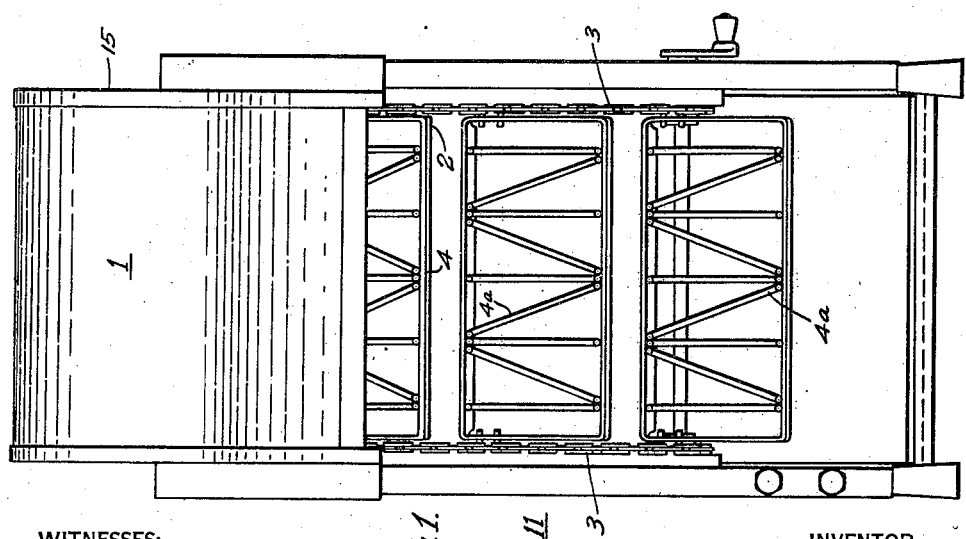
WITNESSES:
C. J. Weller.
Wm. C. Groome
INVENTOR
Karl Ehrgott.
BY
W. R. Coley
ATTORNEY Patented Sept. 5, 1939

2,172,194

UNITED STATES PATENT OFFICE 2,172,194

TOASTER

Karl Ehrgott, Wilkinsburg, Pa., assignor to Westinghouse Electric & Manufacturing Company, East Pittsburgh, Pa., a corporation of Pennsylvania Application October 16, 1936, Serial No. 105,905

7 Claims. (Cl. 53—5)

My invention relates to toasters and more particularly to conveyor type toasters.

In order to obtain properly toasted bread, due to variations in bread moisture, age and sugar content, it is necessary to vary either the toasting heat or the length of time the bread is subjected to such heat. Neither of these methods of adjustment is possible from a practical view in large continuous toasters, because of the inability of an operator to readily ascertain the doneness of the bread until it has been removed from the toasting oven.

It is, therefore, an object of my invention to provide means whereby a toaster may be easily and readily adjusted to produce toast of any desired doneness, and will continue to make such toast from the original setting chosen by the operator.

A further object of my invention is to provide means for preprocessing the bread before it enters the toasting oven.

A further object of my invention is to provide means for deflecting the radiated heat from the toasting oven back upon the fresh or untoasted bread before it is placed within the toasting oven.

Other objects of my invention will either be pointed out specifically in the course of the following description of one form of a device embodying my invention or will be apparent from such description.

In practicing my invention, I provide, in combination with a toaster, comprising a toasting oven, a source of heat therefor, and means such as skeleton type conveyor for disposing bread within the toasting oven, a hood which is placed upon the toaster in such a manner as to deflect the radiated heat from the toasting oven upon the fresh bread so as to preprocess it before entering therein.

In the accompanying drawing:

Figure 1 is a front elevational partial view of a toaster and hood embodying my invention, and Fig. 2 is a partial side sectional view of the structure shown in Fig. 1.

Referring to Figs. 1 and 2, I show a conveyor type toaster 11 having a hood 1 placed over its structure. It is to be understood that this toaster per se is not claimed in my application and that any toaster may serve the purpose. Skeleton conveyor 2 is composed of chain 3 having thereon a plurality of baskets 4 and 4a. Baskets 4 and 4a are attached to chain 3 by brackets 5 or in any other suitable manner. Conveyor 2 is driven by any suitable prime mover such as a motor 6 and operatively associated belt 7.

Located within the toaster 11 is a toasting oven 10 having insulated walls 19 and radiant heating elements 12 associated therewith. Heat may be supplied to the radiant heating elements 12 by electricity, gas, or any other suitable means. The conveyor 2 is interposed within the toasting oven 10 so that baskets 4 and 4a are at an equal distance from the radiant heating elements 12.

An irregular shaped semi-cylindrical hood 1, which may be hollow, is attached to back panel 8 of toaster 11 at 9 in any convenient manner. The hood 1 may have a thermally-non-absorbing surface 13 upon its innermost side and a thermally insulating material 14, preferably rock wool, within the hollow portion thereof. The insulated sides 15 of toaster 11 are extended somewhat above the main toaster structure and form the ends of the hood 1, this forming a preprocessing chamber or oven 16.

I desire it to be understood that hood 1 may be of any desired shape and may be attached to the toaster body itself, either as a separate structure or integrally.

Hood 1 functions as a flue and as a retainer of the heated atmosphere rising from the toasting oven 10 and accordingly supplies heat necessary for the functioning of the preprocessing chamber or oven 16. Chamber 16 preprocesses the untoasted bread by drying and absorbing moisture therefrom. Therefore, regardless of bread age, moisture or sugar content, the preprocessing chamber or oven 16 delivers bread of the same quality or degree of doneness to the toasting oven.

In the operation of the machine, the motor 6 is started and the electrical heaters 12 are connected in any suitable manner to the power supply, not shown. Bread is then placed upon the skeleton baskets 4a which are in an open and uncovered position directly in front of the machine and upon each succeeding basket which occupies the position of 4a. Due to the operation of motor 6 and operatively associated belt 7, chain 3 and operatively associated baskets 4 and 4a are placed in motion. Due to such movement of baskets 4 and 4a, slices of bread placed thereon are first introduced into the radially heated preprocessing chamber 16 where they are dried or preprocessed. As the chain 3 and operatively associated baskets 4 and 4a continue to travel, the bread is introduced along with its retaining basket into the toasting oven 10. Since the baskets 4 and 4a located upon chain 3 are equally distant from the radiant electric heaters 12, both sides of the bread placed within the baskets will be toasted to an even doneness.

As the conveyor continues on through the toasting oven, thus permitting the bread placed thereon to be toasted, the baskets eventually emerge from said toasting oven. Then as the baskets 4 and 4a reach the lowermost point of their travel, the brackets 5 attached at the then lower end of the baskets proceed on with the chain swinging the baskets rapidly in a wide arc to a horizontal position whereupon the toast is permitted to fall therefrom. As the toast falls from the baskets, it contacts a chute 17 which permits it to slide downwardly and frontwardly into a retaining basket 18.

It is to be observed that with a machine utilizing my invention, it is possible to preprocess or dry several pieces of bread while utilizing the excess radiated heat from the toasting oven as other pieces of bread are being toasted to a sufficient doneness within the toaster oven. It is therefore obvious that with a machine utilizing my invention, it is possible for an operator to adjust the machine for any desired doneness of the bread and obtain toast of the same doneness regardless of the age or quality of the bread placed within the toaster.

I desire it to be understood that my invention may be used with any standard type toaster known to the art regardless as to whether or not it be automatic in its operation, or whether or not it might have the conveyor as the interposing means for inserting the bread within the toasting region; and, therefore, I wish it to be understood that various modifications may be made in the device embodied in my invention without departing from the spirit and scope thereof and I desire that only such limitations shall be placed thereon as are imposed by the prior art and the appended claims.

I claim as my invention:

1. In combination, a toaster having a toasting region, a source of heat therefor, means for disposing bread within said toasting region, and means comprising a hood placed over and substantially completely enclosing the upper part of said toaster for downwardly deflecting the heated air from the toasting region back over the untoasted bread whereby it is dried before entering the toasting region.

2. In combination, a toaster having a toasting region, a source of heat therefor, means comprising a conveyor for disposing bread within said toasting region, and means comprising a hood placed over said toaster for collecting the rising column of heated air from the toasting region and deflecting it downwardly over the untoasted bread for preheating it before entering the toasting region.

3. In combination, a toaster having a toasting region, a source of heat therefor comprising radiant heaters upon the sides of said toasting region, means for disposing bread within said toasting region, and means comprising a hood placed over said toaster for collecting the entire rising column of heated air from the toasting region and deflecting it downwardly over the untoasted bread for preheating it before entering the toasting region.

4. In combination, a toaster having a toasting region, a source of heat therefor, means for disposing bread within the toasting region, and means comprising a hood placed over and substantially completely enclosing the upper part of said toaster for deflecting the heated air from the toasting region back over the disposing means whereby bread placed upon the disposing means is first disposed within a heated atmosphere where it is dried and then is disposed within the toasting region where the bread is toasted.

5. In combination, a toaster having a toasting region, a source of heat therefor, means comprising a conveyor for disposing bread within the toasting region, and means comprising a hood placed over and substantially completely enclosing the upper part of said toaster for downwardly deflecting the rising column of heated air from the toasting region back over the conveyor whereby bread placed upon the conveyor is first disposed within a heated atmosphere where it is dried and then is disposed within the toasting region where the bread is toasted.

6. In combination, a toaster having a toasting region, a source of heat therefor, means comprising a continuous conveyor for disposing bread within the toasting region, means comprising a hood placed over and substantially completely enclosing the upper part of said toaster for downwardly deflecting the rising column of heated air from the toasting region back over the conveyor whereby bread placed upon the conveyor is first disposed within a heated atmosphere where it is dried and then is disposed within the toasting region where the bread is toasted, whereby different pieces of bread on said conveyor are simultaneously dried and toasted.

7. In combination, a toaster having a toasting region, a source of heat therefor, means for disposing bread within the toasting region, means comprising a hood placed upon said toaster for collecting the heated air from the toasting region and deflecting it back over the disposing means whereby bread placed upon the disposing means is first disposed within a heated atmosphere where it is dried and then is disposed within the toasting region where the bread is toasted, whereby different pieces of bread on said conveyor are simultaneously predried and toasted.

KARL EHRGOTT.